US012725478B2

(12) United States Patent
Munson

(10) Patent No.: US 12,725,478 B2
(45) Date of Patent: Sep. 1, 2026

(54) SYSTEMS AND METHODS FOR PROVIDING A SIZE AND/OR SHAPE DISCRIMINATING LOCK

(71) Applicant: Thomas Pettit Munson, Lake Stevens, WA (US)

(72) Inventor: Thomas Pettit Munson, Lake Stevens, WA (US)

( * ) Notice: Subject to any disclaimer, the term of this patent is extended or adjusted under 35 U.S.C. 154(b) by 138 days.

(21) Appl. No.: 18/627,161

(22) Filed: Apr. 4, 2024

(65) Prior Publication Data

US 2024/0371224 A1 Nov. 7, 2024

Related U.S. Application Data

(60) Provisional application No. 63/500,070, filed on May 4, 2023.

(51) Int. Cl.
*G07C 9/28* (2020.01)
*G07C 9/00* (2020.01)

(52) U.S. Cl.
CPC ........... *G07C 9/28* (2020.01); *G07C 9/00714* (2013.01)

(58) Field of Classification Search
CPC .............................. G07C 9/28; G07C 9/00714
See application file for complete search history.

(56) References Cited

U.S. PATENT DOCUMENTS 9,804,596 B1 * 10/2017 Slavin .................. G05D 1/0094
2006/0114099 A1 * 6/2006 Deng ................. G07C 9/00563 70/277
2010/0307206 A1 * 12/2010 Taylor ................ G07C 9/00309 70/91
2019/0035183 A1 * 1/2019 Bennett .............. G06K 7/10316
2021/0324672 A1 * 10/2021 Altiner ..................... G07C 9/28

* cited by examiner

*Primary Examiner* — Travis R Hunnings
*Assistant Examiner* — Sharmin Akhter
(74) *Attorney, Agent, or Firm* — Fox Rothschild LLP; Carol E. Thorstad-Forsyth

(57) ABSTRACT

Systems and methods for operating a locking device. The methods comprising: performing operations by at least one sensor of the locking device to generate sensor data indicating at least one of a size of an animal and a shape of an animal; comparing, by a processing unit of the locking device, the size of the animal to at least one threshold value and/or the shape of the animal to a reference shape; classifying, by the processing unit, the animal as an authorized animal or an unauthorized animal based on the comparing; and granting or denying access to an internal area of a compartment based on the classifying. The granting comprises actuating a lock of the locking device such that the lock transitions from a locked position to an unlocked position.

18 Claims, 6 Drawing Sheets

SYSTEMS AND METHODS FOR PROVIDING A SIZE AND/OR SHAPE DISCRIMINATING LOCK

CROSS-REFERENCE TO RELATED APPLICATIONS

The present application claims priority to and the benefit of U.S. Provisional Patent Application No. 63/500,070 which was filed on May 4, 2023. The content of this Provisional Patent Application is incorporated herein by reference in its entirety.

BACKGROUND

Description of the Related Art

Existing security devices are designed to limit access to individuals based on some unique knowledge or physical attribute such as a code, fingerprint, key, etc. For example, existing child safety locks are designed to limit children's access to hazardous areas such as kitchen or medicine cabinets. Current child safety locks require the user to perform an action that cannot commonly be performed by a child. The additional step or use of special equipment required to operate a door, drawer, etc. adds inconvenience, additional time, frustration and, in some cases, confusion to the user. The added inconvenience, time, frustration and confusion can lead the user to disable or remove the child safety lock.

SUMMARY

The present document concerns implementing systems and methods for operating a locking device. The methods comprise: performing operations by at least one sensor of the locking device to generate sensor data indicating at least one of a size of an animal and a shape of an animal; comparing, by a processing unit of the locking device, the size of the animal to at least one threshold value and/or the shape of the animal to a reference shape; classifying, by the processing unit, the animal as an authorized animal or an unauthorized animal based on the comparing; and granting or denying access to an internal area of a compartment based on the classifying. The granting comprises actuating a lock of the locking device such that the lock transitions from a locked position to an unlocked position.

The sensor(s) can include, but are not limited to, a touch sensor, a touchless sensor, and/or a capacitive touch sensor. The sensor data may specify a change in capacitance detected by the capacitive touch sensor, and/or a change in an electric field and/or a characteristic of a reflected signal received by the sensor(s). The characteristic of the reflected signal may comprise an intensity of a light and/or a strength of a reflected signal.

The sensor(s) may be at least partially integrated with a grip structure or an access panel of the compartment. The grip structure may be used as a sensor probe for the sensor(s) and to facilitate an opening and closing of the access panel. The grip structure may be interchangeable with other grip structures so that the sensor(s) of the locking device can be replaced with other sensor(s) of the same or different type. The access panel may be used as a sensor probe for the sensor(s) and to facilitate selective access to the internal area of the compartment.

The present document concerns a locking device. The locking device comprises: a lock; sensor(s) configured to generate sensor data indicating at least one of a size of an animal and a shape of an animal; and a processing unit. The processor is configured to compare the size of the animal to at least one threshold value and/or the shape of the animal to a reference shape, classify the animal as an authorized animal or an unauthorized animal based on the comparing, and grant or deny access to an internal area of a compartment based on a classification of the animal. The access to the internal area of the compartment may be granted by actuating the lock of the locking device such that the lock transitions from a locked position to an unlocked position. This actuation may be automatically, automatedly and/or autonomously performed by the locking device.

The present document also concerns a controllable output power circuit. The circuit comprises: a processor; and a non-transitory computer-readable storage medium comprising programming instructions that are configured to cause the processor to implement a method for operating a locking device. The programming instructions comprise instructions to: obtain sensor data indicating at least one of a size of an animal and a shape of an animal; compare the size of the animal to at least one threshold value and/or the shape of the animal to a reference shape; classify the animal as an authorized animal or an unauthorized animal based on the comparing; and grant or deny access to an internal area of a compartment based on the classifying. Access to the internal area may be granted by actuating a lock of the locking device such that the lock transitions from a locked position to an unlocked position.

BRIEF DESCRIPTION OF THE DRAWINGS

The present solution will be described with reference to the following drawing figures, in which like numerals represent like items throughout the figures.

DETAILED DESCRIPTION

Figure 1:
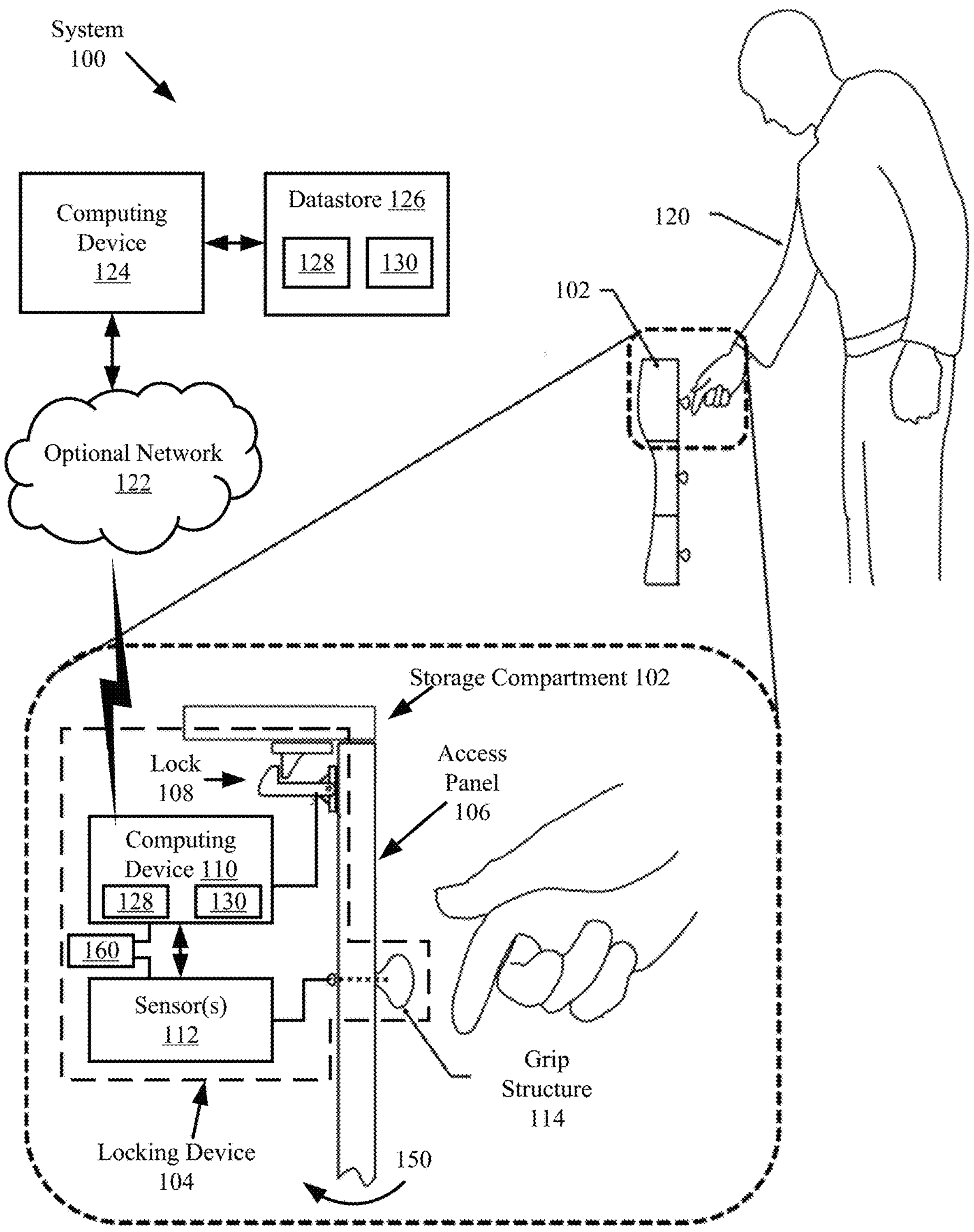
FIG. 1 provides an illustration of a cabinet drawer incorporating key elements of the present solution with a touch sensor.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In this document, when terms such as "first" and "second" are used to modify a noun, such use is simply intended to distinguish one item from another, and is not intended to require a sequential order unless specifically stated.

The present solution generally concerns a locking device that discriminates users based on size and/or shape of a user. The locking device includes a lock, sensor(s), circuitry and logic elements. The sensor(s), circuitry and logic elements determine the size and/or shape of the user. The size and/or shape of the user is compared to a pre-determined criteria. If the pre-determined criteria is met (e.g., the user has a size and/or shape within size and/or shape limits), then the lock is actuated so that it transitions from a locked position to an unlocked position. At this time, the user is able to access items inside a storage compartment. The lock may then be actuated once again so that it returns to the locked position. Lock actuation may be automatically, automatedly and/or autonomously performed by the circuitry of the locking device.

The locking device may be used as a child safety lock. In this case, a door security device measures the size and/or shape of the user and only allows larger, adult users access to cabinet, drawers, etc. The user is not required to perform any additional steps or use specialized equipment to operate the door, drawer, etc. Rather the operation of the door, drawer, etc. remains unchanged to the adult/larger person users but denies access to younger/smaller users.

The locking device may additionally or alternatively be used to selectively allow access to the internal contents of a storage compartment to humans but not non-human animals (for example, dogs), to a first type of animal (for example, dogs or bird) but not to a second type of animal (for example, cats or squirrel). The locking device measures the size and/or shape of the user, allows the desired or authorized individual(s) to operate the locking device (door, drawer, food bin, etc.), and denies other undesired or unauthorized user(s) that ability to operate the locking device.

Referring now to FIG. 1, there is provided an illustration of a system 100 implementing the present solution. System 100 is generally configured to selectively allow individuals access to contents stored in a storage compartment 102. The individuals can include, but are not limited to, humans and/or non-human animals (for example, dogs, cats, birds, etc.). The storage compartment 102 can be a piece of furniture, a portable item or integrated in a vehicle, a wall of a building or other object. As such, the storage compartment 102 can include, but is not limited to, a drawer, a chest of drawers, a cabinet, a box, a console, a glove compartment and/or a trunk.

At least one locking device 104 is provided with the storage compartment 102. A grip structure 114 of the locking device 104 is coupled to an access panel 106 to facilitate a user's access to an internal cavity or space 150 inside the storage compartment 102. The grip structure 114 can include, but is not limited to, a knob or a handle. Sensor(s) 112 are coupled to and/or at least partially integrated with the grip structure 114 and/or access panel 106. In the latter case, the grip structure 114 acts as a sensor probe in addition to a gripping means for facilitating an opening/closing the access panel 106 and/or the access panel 106 acts as a sensor probe in addition to an access means for providing access to contents of the storage compartment 102. The sensor(s) 112 can include, but are not limited to, a proximity sensor, a touch sensor (for example, capacitive touch sensor), an imaging device, and/or a touchless sensor. The proximity sensor is an optional component and configured to detect when an individual 120 is proximate (for example, within 1-2 feet of) the storage compartment 102. When such a detection is made, the computing device 110 and/or other sensor(s) 112 may be enabled, turned on, or transitioned from a power save mode. In this regard, a power source 160 is provided with the locking device 104. The power source can include, but is not limited to, a battery and/or an energy harvesting circuit that harvests energy in an environment and stores the energy in an electronic device (for example, a capacitor or battery) in a manner known in the art.

The touch sensor 112 is configured to detect and record times when the individual 120 touches the grip structure 114 and/or access panel 106. The touch sensor can include, but is not limited to, a capacitive touch sensor. The capacitive touch sensor measures a change in capacitance due to the grip structure 114 and/or access panel 106 being in contact with the individual 120. The measured capacitance or change in capacitance is communicated from the touch sensor to the computing device 110.

Figure 2:
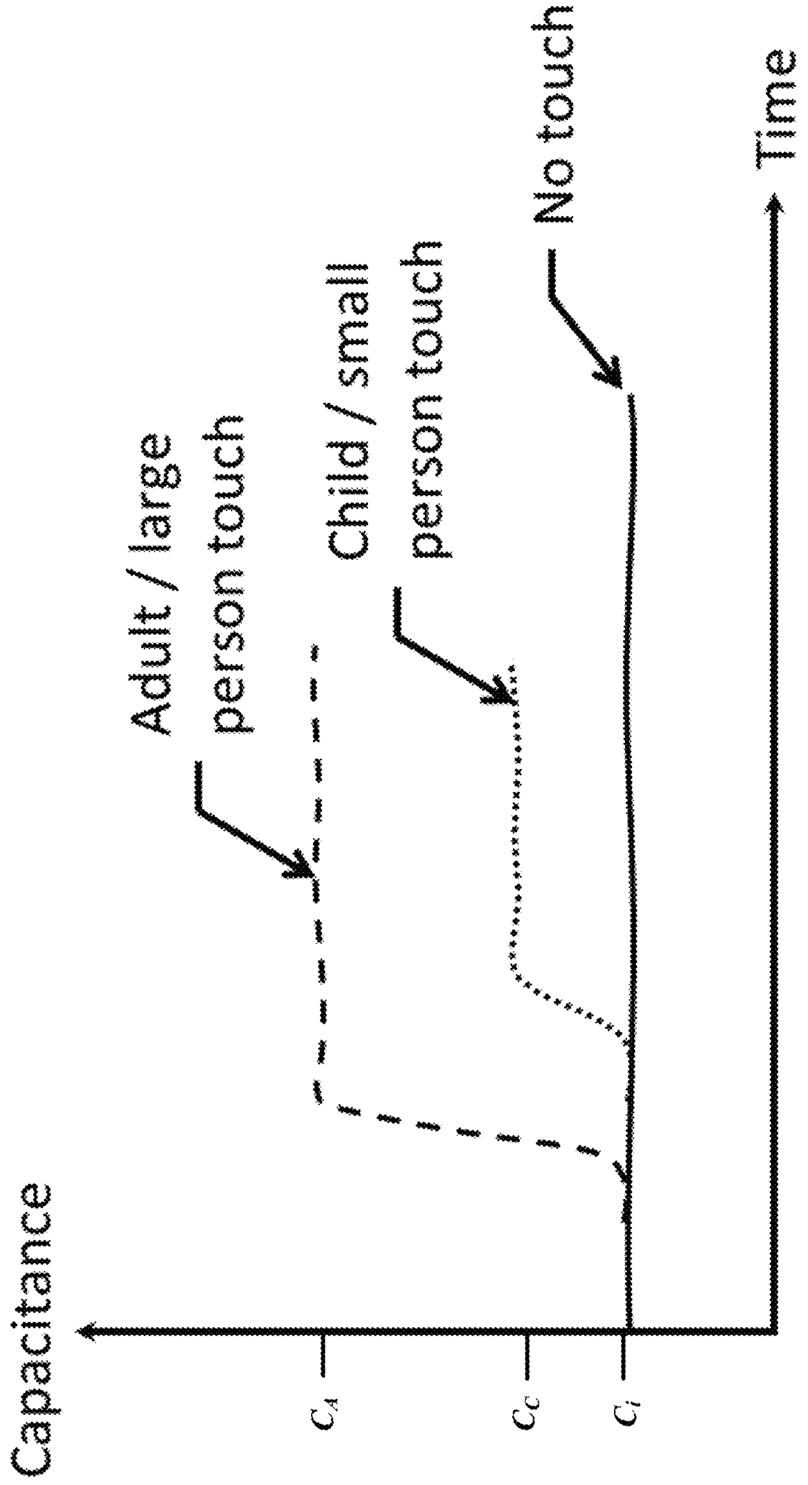
FIG. 2 provides a graph showing a signal response of the touch sensor in FIG. 1 to various sized and/or shaped individuals touching the sensor.

At the computing device 110, the measured capacitance or change in capacitance is compared to threshold value(s) 130. The threshold value(s) 130 is (are) selected based on a minimum or maximum size (for example, height, length and/or width) of an animal that is authorized to access contents of the storage compartment 102. A graph is provided in FIG. 2 which shows an initial capacitance $C_i$ of the capacitance sensor, a measured capacitance $C_A$ associated with an adult or relatively large person, and a measured capacitance $C_C$ associated with a child or relatively small person. The capacitance of the capacitance sensor changes by a different amount depending on the overall size of the animal in physical contact with the sensor probe. A threshold value can be selected to be between measured capacitances $C_C$ and $C_A$. Another threshold value could be selected to be greater than measured capacitance $C_A$ so as to exclude potentially higher measured capacitances for animals larger than an adult person. The present solution is not limited to the particulars of FIG. 2. The threshold value(s) 130 can be stored in a datastore of the computing device 110 and/or a remote datastore 126. In this regard, the computing device 110 may be configured to communicate with a remote computing device 124 via a network 122 (for example, the Internet or an Intranet).

If the measured capacitance or change in capacitance does not fall within a range defined by the threshold value(s) or otherwise does not meet the size limit(s), then the computing device 110 concludes that the individual 120 is not an authorized individual. Responsive to this conclusion, the computing device 110 does not take any action for actuating the lock 108. The lock 108 can include, but is not limited to, an electromechanical lock and/or a digital lock. The computing device 110 may perform operations to: notify the individual 120 or other individual (for example, a parent or caretaker) that the individual 120 is considered by the locking device 104 to be an unauthorized individual and therefore will not be provided access to the contents of the storage compartment 102; and/or log timestamped data 128 recording the access denial event. The timestamped data 128 can be stored in a datastore of the computing device 110 and/or a remote datastore 126.

If the measured capacitance or change in capacitance falls within a range defined by the threshold value(s) or otherwise meets the size limit(s), then the computing device 110 concludes that the individual 120 is an authorized individual. Responsive to this conclusion, the computing device 110 performs operations to actuate the lock 108. This actuation causes the lock 108 to transition from a locked position to an unlocked position. The computing device 110 may perform operations to: log timestamped data recording the access event; and/or notify other individual(s) that access to the contents of the storage compartment 102 has been given to an individual. The timestamped data can be stored in a datastore of the computing device 110 and/or a remote datastore 126.

The imaging device 112 is configured to capture an image of the individual 120 in proximity to the storage compartment 102. The captured image can be analyzed by the imaging device or communicated to the computing device 110 for processing. The image processing is performed to detect the individual and obtain a classification for the individual. The classification can be a human, an adult human, a child human, a dog, a cat, a bird or other animal. The classification can be used in addition to or as an alternative to the capacitive thresholding for making a determination as whether the individual should be allowed access to the contents of the storage compartment 102. For example, the classification can be used to verify that the results of the capacitive thresholding are consistent with the classification of the object.

The touchless sensor 112 is configured to produce an electric field and measure a change in the electric field when the individual enters the electric field. The measured change in the electric field is communicated from the touchless sensor to the computing device 110. At the computing device 110, the measured change in the electric field is compared to threshold value(s). The threshold value(s) can be selected based on the size and/or shape of individuals. The threshold value(s) define the amount by which the electric field can change for allowing access to contents of the storage compartment.

Figure 3:
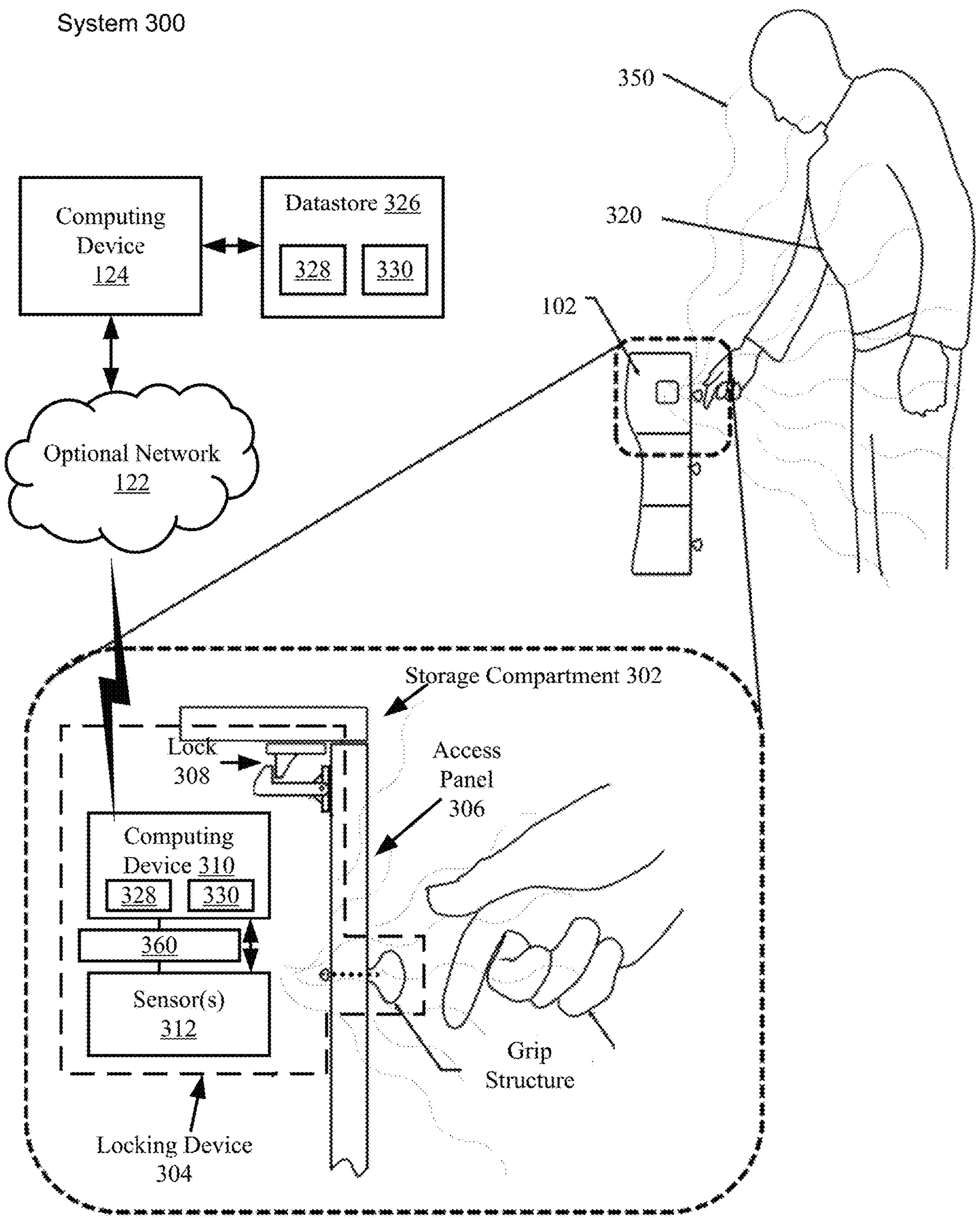
FIG. 3 provides an illustration of a cabinet drawer incorporating key elements of the present solution with a touchless sensor.

The present solution is not limited to the particulars of locking device 104 shown in FIG. 1. FIG. 3 shows a system 300 which is similar to system 100 except for the type of sensor(s) used for detecting a size and/or shape of the individual. The sensor(s) 312 of FIG. 3 can be used in addition to or as an alternative to sensors 112 of FIG. 1. Sensor(s) 312 of locking device 304 include, but are not limited to, a radar device, a sonar device and/or other devices configured to emit signals and detect signals reflected off of individuals. The sensor(s) 312 emit signal(s) 350 into an area in front of the storage compartment 302. The emitted signal(s) is (are) reflected off of the individual 320 when (s)he comes in proximity to the storage compartment 302. The sensor(s) 312 detect the reflected signals and generate(s) sensor data based on such detections. The sensor data is communicated to the computing device 310 for further processing.

The computing device 310 analyzes the sensor data to obtain size measurement(s) and/or a shape of the individual 320. The size measurement(s) can include a length, a width and/or a height. The size measurement(s) is (are) compared to threshold value(s) 330 defining size limits. The threshold value(s) can be selected based on a database of collected data specifying ranges of sizes for older animal of a given type (for example, human) and younger animals of the given type. The shape of the individual may additionally or alternatively be compared to a plurality of reference shapes 330 to classify the animal and then obtain pre-defined shape limits.

Figure 4:
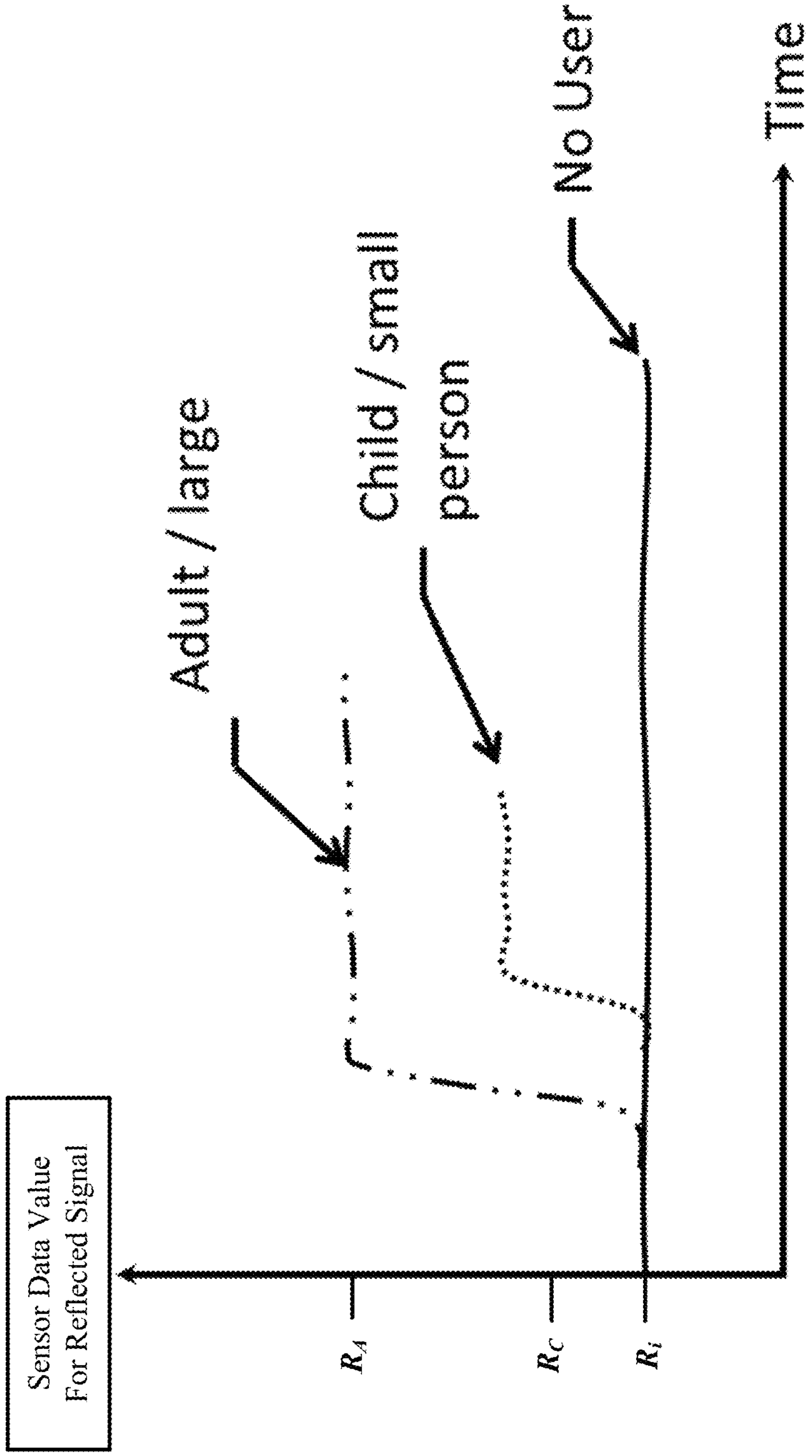
FIG. 4 provides a graph showing a signal response of the touchless sensor in FIG. 3 to various sized and/or shaped individuals in proximity thereto.

A graph is provided in FIG. 4 which shows an initial sensor data value $R_i$ associated with a reflected signal received by a sensor 312 of FIG. 3, a sensor data value $R_A$ associated with an adult or relatively large person, and a sensor data value $R_C$ associated with a child or relatively small person. The sensor data value changes by a different amount depending on the overall size of the animal from which the emitted signal 350 is reflected. A threshold value can be selected to be between sensor data values $R_C$ and $R_A$. Another threshold value could be selected to be greater than sensor data value $R_A$ so as to exclude potentially higher sensor data values for animals larger than an adult person. The present solution is not limited to the particulars of FIG. 4.

If the size limits and/or shape limits are not met, then the computing device 310 concludes that the individual 320 is not an authorized individual. Responsive to this conclusion, the computing device 310 does not take any action for actuating the lock 308. The lock 308 can include, but is not limited to, an electromechanical lock and/or a digital lock. The computing device 310 may perform operations to: notify the individual 320 or other individual (for example, a parent or caretaker) that the individual 320 is considered by the locking device 304 to be an unauthorized individual and therefore will not be provided access to the contents of the storage compartment 302; and/or log timestamped data 328 recording the access denial event. The timestamped data 328 can be stored in a datastore of the computing device 310 and/or a remote datastore 326.

If the size limits and/or shape limits are met, then the computing device 310 concludes that the individual 320 is an authorized individual. Responsive to this conclusion, the computing device 310 performs operations to actuate the lock 308. This actuation causes the lock 308 to transition from a locked position to an unlocked position. The computing device 310 may perform operations to: log timestamped data recording the access event; and/or notify other individual(s) that access to the contents of the storage compartment 102 has been given to an individual. The timestamped data can be stored in a datastore of the computing device 310 and/or a remote datastore 326.

Figure 5:
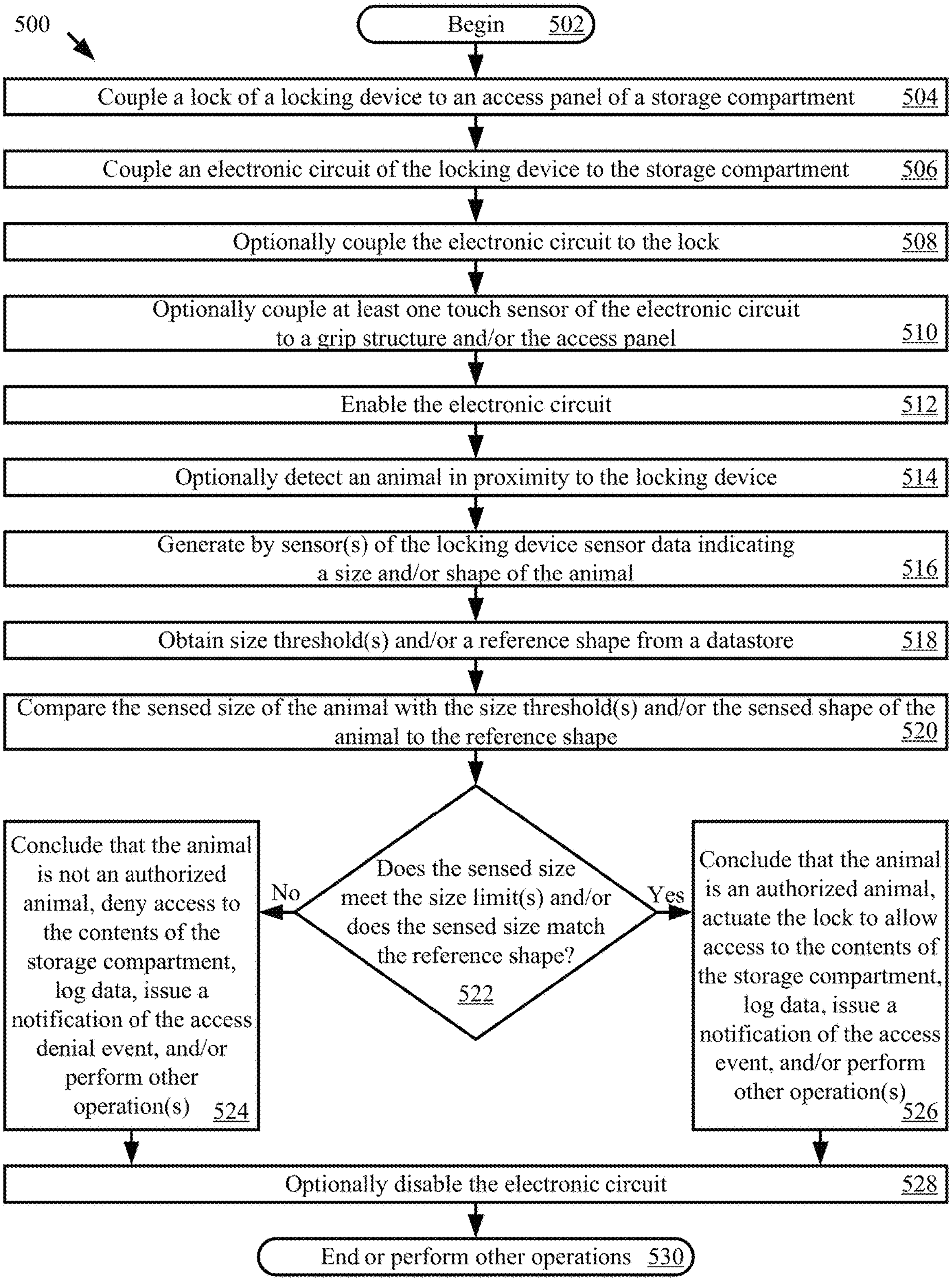
FIG. 5 provides a flow diagram of an illustrative method for operating a locking device.

FIG. 5 provides a flow diagram of an illustrative method 500 for operating a locking device (for example, locking device 104 of FIGS. 1 and/or 304 of FIG. 3). Method 500 begins with 502 and continues with 504 where a lock (for example, lock 108 of FIG. 1 or 308 of FIG. 3) of the locking device is coupled to an access panel (for example, access panel 106 of FIG. 1 or 306 of FIG. 3) of a storage compartment (for example, storage compartment 102 of FIG. 1 or 302 of FIG. 3), a shown by block 504. In 506, an electronic circuit of the locking device is coupled to the storage compartment. The electronic circuit can include, but is not limited to, a computing device (for example, computing device 110 of FIG. 1 or 310 of FIG. 3), sensor(s) (for example, sensor(s) 112 of FIG. 1 or 312 of FIG. 3), and/or power source(s) (for example, power source(s) 160 of FIG. 1 or 360 of FIG. 3). The electronic circuit can be optionally coupled to the lock in 508. Touch sensor(s) of the electronic circuit can optionally be coupled to a grip structure (for example, grip structure 114 of FIG. 1) and/or the access panel, as shown by 510. In 512, the electronic circuit is enabled.

Next in 514, the locking device optionally performs operations to detect an animal located in proximity to the locking device. The term "proximity" as used here means within a sensor's range of detection. The animal can include, but is not limited to, a human (for example, individual 120 of FIG. 1), a dog, a cat, a bird, and/or farm animal. This detection can be achieved using a proximity sensor (for example, a beam break sensor) and/or an imaging device (for example, a camera).

In 516, sensor(s) of the locking device perform operations to generate sensor data indicating a size and/or shape of the animal. The sensor data can include, but is not limited to, a capacitance value, an amount of change in capacitance from a particular capacitance value, an amount of change of an electric field, a characteristic of a reflected signal, a point cloud, and/or a captured image. The sensed size of the animal may be compared with size threshold(s) as shown in 520. Additionally or alternatively, the sensed shape of the animal is compared with the reference shape in 520.

If the sensed size does not meet the size limit(s) and/or the sensed size does not match (by a certain amount such as ≥75%) the reference shape [522: NO], then method 500 continues with 524 where the locking device concludes that the animal is not an authorized animal and denies the animal access to the contents of the storage compartment. The locking device may additionally log data regarding the access denial event, issue a notification of the occurrence of the access denial event, and/or perform other operations (for example, return to 502).

If the sensed size does meet the size limit(s) and/or the sensed size does match (by a certain amount such as ≥75%) the reference shape [522: YES], then method 500 continues with 526 where the locking device concludes that the animal is an authorized animal and grants the animal access to the contents of the storage compartment. In this regard, the electronic circuit of the locking mechanism caused actuation of the lock such that the lock transitions from its locked position to its unlocked position. The locking device may additionally log data regarding the access grant event, issue a notification of the occurrence of the access grant event, and/or perform other operations (for example, return to 502).

In 528, the electronic circuit of the locking device may optionally be disabled. This could be done when, for example, the power source needs to be recharged, the lock is being replaced, the grip structure is being replaced with another grip structure, and/or the locking device is being removed from the storage compartment. Subsequently, 530 is performed where method 500 ends or other operations are performed (for example, return to 502).

Figure 6:
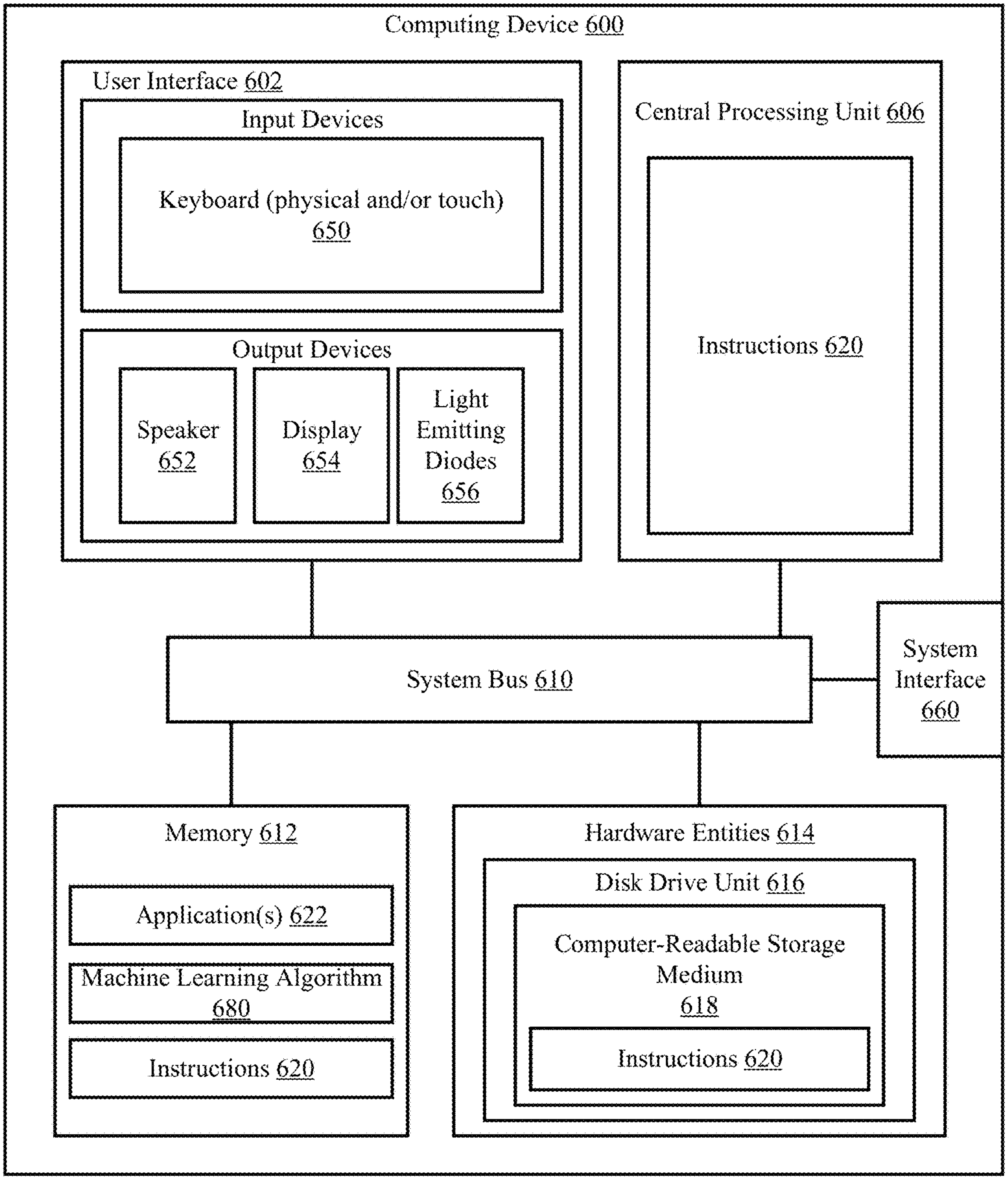
FIG. 6 provides a block diagram of a computing device.

FIG. 6 provides an illustration of a computing device 600. Computing device(s) 110, 124 of FIG. 1 and/or computing device(s) 310, 324 is (are) the same as or similar to computing device 600. As such, the discussion of computing device 600 is sufficient for understanding these component of system 100.

In some scenarios, the present solution is used in a client-server architecture. Accordingly, the computing device architecture shown in FIG. 6 is sufficient for understanding the particulars of client computing devices and servers.

Computing device 600 may include more or less components than those shown in FIG. 6. However, the components shown are sufficient to disclose an illustrative solution implementing the present solution. The hardware architecture of FIG. 6 represents one implementation of a representative computing device configured to provide an improved item return process, as described herein. As such, the computing device 600 of FIG. 6 implements at least a portion of the method(s) described herein.

Some or all components of the computing device 600 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

As shown in FIG. 6, the computing device 600 comprises a user interface 602, a Central Processing Unit (CPU) 606, a system bus 610, a memory 612 connected to and accessible by other portions of computing device 600 through system bus 610, a system interface 660, and hardware entities 614 connected to system bus 610. The user interface can include input devices and output devices, which facilitate user-software interactions for controlling operations of the computing device 600. The input devices include, but are not limited, a physical and/or touch keyboard 650. The input devices can be connected to the computing device 600 via a wired (serial or Wired LAN) or wireless connection (for example, a Bluetooth® connection or WiFi connection). The output devices include, but are not limited to, a speaker 652, a display 654, and/or light emitting diodes 656. System interface 660 is configured to facilitate wired or wireless communications to and from external devices (for example, network nodes such as access points, etc.).

At least some of the hardware entities 614 perform actions involving access to and use of memory 612, which can be a Radom Access Memory (RAM), a disk driver, a Compact Disc Read Only Memory (CD-ROM), other form of data storage, and/or remote "cloud" based processing. Hardware entities 614 can include a disk drive unit 616 comprising a computer-readable storage medium 618 on which is stored one or more sets of instructions 620 (for example, software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media", as used here, refers to a single medium or multiple media (for example, a centralized or distributed database, and/or associated caches and servers) that store the one or more sets of instructions 620. The term "machine-readable media", as used here, also refers to any medium that is capable of storing, encoding or carrying a set of instructions 620 for execution by the computing device 600 and that cause the computing device 600 to perform any one or more of the methodologies of the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

Without excluding further possible embodiments, certain example embodiments are summarized in the following clauses:

Clause 1: A method operating a locking device, comprising: performing operations by at least one sensor of the locking device to generate sensor data indicating at least one of a size of an animal and a shape of an animal; comparing, by a processing unit of the locking device, the size of the animal to at least one threshold value and/or the shape of the animal to a reference shape; classifying, by the processing unit, the animal as an authorized animal or an unauthorized animal based on the comparing; and granting or denying access to an internal area of a compartment based on the classifying; wherein the granting comprises actuating a lock of the locking device such that the lock transitions from a locked position to an unlocked position.

Clause 2: The method of clause 1, wherein the at least one sensor comprises a touch sensor or a touchless sensor.

Clause 3: The method of any of the preceding clauses, wherein the at least one sensor comprises a capacitive touch sensor and the sensor data specifies a change in capacitance detected by the capacitive touch sensor.

Clause 4: The method of any of the preceding clauses, wherein the sensor data specifies a change in an electric field and/or a characteristic of a reflected signal received by the at least one sensor.

Clause 5: The method of any of the preceding clauses, wherein the characteristic of the reflected signal comprises an intensity of a light and/or a strength of a reflected signal.

Clause 6: The method of any of the preceding clauses, wherein the at least one sensor is at least partially integrated with a grip structure or an access panel of the compartment.

Clause 7: The method of any of the preceding clauses, further comprising using the grip structure as a sensor probe for the at least one sensor and to facilitate an opening and closing of the access panel.

Clause 8: The method of any of the preceding clauses, wherein the grip structure is interchangeable with other grip structures so that the at least one sensor of the locking device can be replaced with another sensor of the same or different type.

Clause 9: The method of any of the preceding clauses, further comprising using the access panel as a sensor probe for the at least one sensor and to facilitate selective access to the internal area of the compartment.

Clause 10: A locking device, comprising: a lock; at least one sensor configured to generate sensor data indicating at least one of a size of an animal and a shape of an animal; and a processing unit configured to compare the size of the animal to at least one threshold value and/or the shape of the animal to a reference shape, classify the animal as an authorized animal or an unauthorized animal based on the comparing, and grant or deny access to an internal area of a compartment based on a classification of the animal; wherein the access to the internal area of the compartment is granted by actuating the lock of the locking device such that the lock transitions from a locked position to an unlocked position.

Clause 11: The locking device according to clause 10, wherein the at least one sensor comprises a touch sensor or a touchless sensor.

Clause 12: The locking device of any of the preceding clauses, wherein the at least one sensor comprises a capacitive touch sensor and the sensor data specifies a change in capacitance detected by the capacitive touch sensor.

Clause 13: The locking device of any of the preceding clauses, wherein the sensor data specifies a change in an electric field and/or a characteristic of a reflected signal received by the at least one sensor.

Clause 14: The locking device of any of the preceding clauses, wherein the characteristic of the reflected signal comprises an intensity of a light and/or a strength of a reflected signal.

Clause 15: The locking device of any of the preceding clauses, wherein the at least one sensor is at least partially integrated with a grip structure or an access panel of the compartment.

Clause 16: The locking device of any of the preceding clauses, wherein the grip structure is configured to provide a sensor probe for the at least one sensor and facilitate an opening and closing of the access panel.

Clause 17: The locking device of any of the preceding clauses, wherein the grip structure is interchangeable with other grip structures so that the at least one sensor of the locking device can be replaced with another sensor of the same or different type.

Clause 18: The locking device of any of the preceding clauses, wherein the access panel is configured to provide a sensor probe for the at least one sensor and facilitate selective access to the internal area of the compartment.

Clause 19: A controllable output power circuit, comprising: a processor; and a non-transitory computer-read-able storage medium comprising programming instructions that are configured to cause the processor to implement a method for operating a locking device, wherein the programming instructions comprise instructions to: obtaining sensor data indicating at least one of a size of an animal and a shape of an animal; comparing the size of the animal to at least one threshold value and/or the shape of the animal to a reference shape; classifying the animal as an authorized animal or an unauthorized animal based on the comparing; and granting or denying access to an internal area of a compartment based on the classifying; wherein the granting comprises actuating a lock of the locking device such that the lock transitions from a locked position to an unlocked position.

The breadth and scope of this disclosure should not be limited by any of the above-described example embodiments, but should be defined only in accordance with the following claims and their equivalents.

What is claimed is:

1. A method for operating a locking device, comprising:

performing operations by at least one sensor of the locking device to generate sensor data indicating at least one of a size of an animal and a shape of an animal;

comparing, by a processing unit of the locking device, the size of the animal to a minimum threshold size value and a maximum threshold size value to determine whether or not size limits are met, the size limits being met when the size of the animal falls between the minimum and maximum threshold size values;

classifying, by the processing unit, the animal as an authorized animal or an unauthorized animal based on the comparing, wherein the animal is classified as an authorized animal when results of the comparing indicate that size limits are met and the animal is classified as an unauthorized animal when the results of the comparing indicate that the size limits are not met; and granting or denying access to an internal area of a compartment based on the classifying;

wherein the granting comprises actuating a lock of the locking device such that the lock transitions from a locked position to an unlocked position;

wherein the at least one sensor is at least partially integrated with a grip structure configured to facilitate manual opening and closing of an access panel of the compartment; and wherein the at least one sensor comprises a capacitive touch sensor configured to measure capacitance, the sensor data specifies a change in capacitance detected by the capacitive touch sensor, and the method further comprises performing capacitive thresholding by comparing the measured capacitance to a threshold that was selected based on a minimum or maximum size for the authorized animal.

2. The method according to claim 1, wherein the at least one sensor comprises a touchless sensor configured to produce an electric field, the sensor data specifies a measured change in the electric field, and the method further comprises comparing the measured change in the electric field to a threshold value which was selected based on a size and/or shape of the authorized animal.

3. The method according to claim 1, wherein the sensor data specifies a change in an electric field and/or a characteristic of a reflected signal received by the at least one sensor.

4. The method according to claim 3, wherein the characteristic of the reflected signal comprises an intensity of a light and/or a strength of a reflected signal.

5. The method according to claim 1, wherein the at least one sensor comprises an imaging device and the method further comprises:

processing an image captured by the imaging device;

assigning an object type classification to the animal based on the image processing; and using the object type classification to verify that results of said capacitive thresholding are consistent with the object type classification, prior to classifying the animal as an authorized animal or an unauthorized animal.

6. The method according to claim 1, further comprising using the grip structure as a sensor probe for the at least one sensor and to facilitate an opening and closing of the access panel.

7. The method according to claim 1, further comprising interchanging a grip structure with another grip structure so that the at least one sensor of the locking device is replaced with another sensor of the same or different type.

8. The method according to claim 1, further comprising using the access panel as a sensor probe for the at least one sensor and to facilitate selective access to the internal area of the compartment.

9. The method according to claim 1, further comprising:

comparing, by a processing unit of the locking device, the shape of the animal to a reference shape to determine whether or not shape limits are met;

wherein the animal is classified as an authorized animal when the shape limits are met and the animal is classified as an unauthorized animal when shape limits are not met.

10. A locking device, comprising:

a lock;

at least one sensor configured to generate sensor data indicating at least one of a size of an animal and/or a shape of an animal, the at least one sensor being at least partially integrated with a grip structure configured to facilitate manual opening and closing of an access panel of a compartment; and a processing unit configured to compare the size of the animal to a minimum threshold size value and a maximum threshold size value to determine whether or not size limits are met, the size limits being met when the size of the animal falls between the minimum and maximum threshold size values;

classify the animal as an authorized animal or an unauthorized animal based on the comparing, wherein the animal is classified as an authorized animal when results of the comparing indicate that size limits are met and the animal is classified as an unauthorized animal when the results of the comparing indicate that the size limits are not met; and grant or deny access to an internal area of the compartment based on a classification of the animal;

wherein the access to the internal area of the compartment is granted by actuating the lock of the locking device such that the lock transitions from a locked position to an unlocked position; and wherein the at least one sensor comprises a capacitive touch sensor configured to measure capacitance, the sensor data specifies a change in capacitance detected by the capacitive touch sensor, and the processing unit is further configured to perform capacitive thresholding by comparing the measured capacitance to a threshold that was selected based on a minimum or maximum size for the authorized animal.

11. The locking device according to claim 10, wherein the at least one sensor comprises a touch sensor or a touchless sensor.

12. The locking device according to claim 10, wherein the sensor data specifies a change in an electric field and/or a characteristic of a reflected signal received by the at least one sensor.

13. The locking device according to claim 12, wherein the characteristic of the reflected signal comprises an intensity of a light and/or a strength of a reflected signal.

14. The locking device according to claim 10, wherein the processing unit configured further to assign an object type classification to the animal and use the object type classification to verify results of comparing the size of the animal to at least one threshold value and/or the shape of the animal to a reference shape.

15. The locking device according to claim 10, wherein the grip structure is configured to provide a sensor probe for the at least one sensor and facilitate an opening and closing of the access panel.

16. The locking device according to claim 10, wherein the grip structure is interchangeable with other grip structures so that the at least one sensor of the locking device can be replaced with another sensor of the same or different type.

17. The locking device according to claim 10, wherein the access panel is configured to provide a sensor probe for the at least one sensor and facilitate selective access to the internal area of the compartment.

18. A controllable output power circuit, comprising:

a processor; and a non-transitory computer-readable storage medium comprising programming instructions that are configured to cause the processor to implement a method for operating a locking device, wherein the programming instructions comprise instructions to:

obtain sensor data indicating at least one of a size of an animal and/or a shape of an animal;

compare the size of the animal to a minimum threshold size value and a maximum threshold size value to determine whether or not size limits are met, the size limits being met when the size of the animal falls between the minimum and maximum threshold size values;

classify the animal as an authorized animal or an unauthorized animal based on the comparing, wherein the animal is classified as an authorized animal when results of the comparing indicate that size limits are met and the animal is classified as an unauthorized animal when the results of the comparing indicate that the size limits are not met; and grant or deny access to an internal area of a compartment based on the classifying;

wherein the granting comprises actuating a lock of the locking device such that the lock transitions from a locked position to an unlocked position;

wherein at least a portion of the sensor data is generated by at least one sensor that is at least partially integrated with a grip structure configured to facilitate manual opening and closing of an access panel of the compartment; and wherein the at least one sensor comprises a capacitive touch sensor configured to measure capacitance, the sensor data specifies a change in capacitance detected by the capacitive touch sensor, and the programming instructions further comprise instructions to perform capacitive thresholding by comparing the measured capacitance to a threshold that was selected based on a minimum or maximum size for the authorized animal.

* * * * *